May 29, 1956  A. C. MARSHALL  2,747,305
GRUBBING ATTACHMENT FOR A FARM TRACTOR
Filed March 16, 1954  3 Sheets-Sheet 1
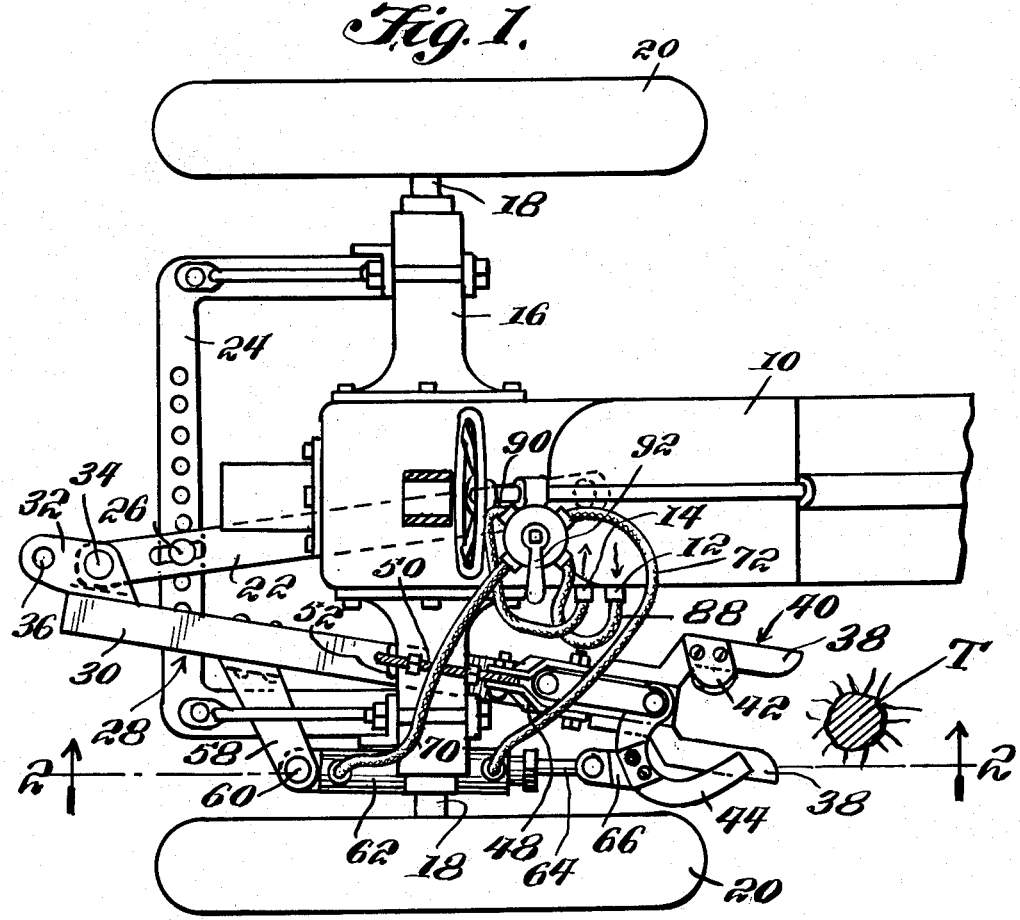
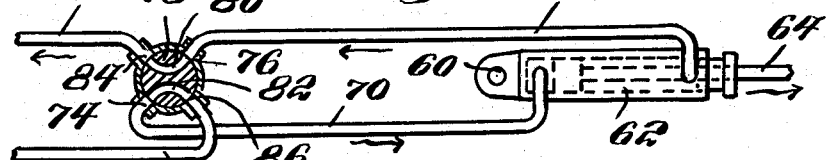
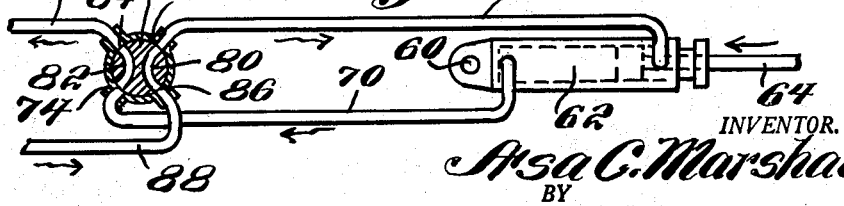
INVENTOR.
Asa C. Marshall,
BY
McMorrow, Berman & Davidson
ATTORNEYS May 29, 1956  A. C. MARSHALL  2,747,305
GRUBBING ATTACHMENT FOR A FARM TRACTOR
Filed March 16, 1954  3 Sheets-Sheet 2
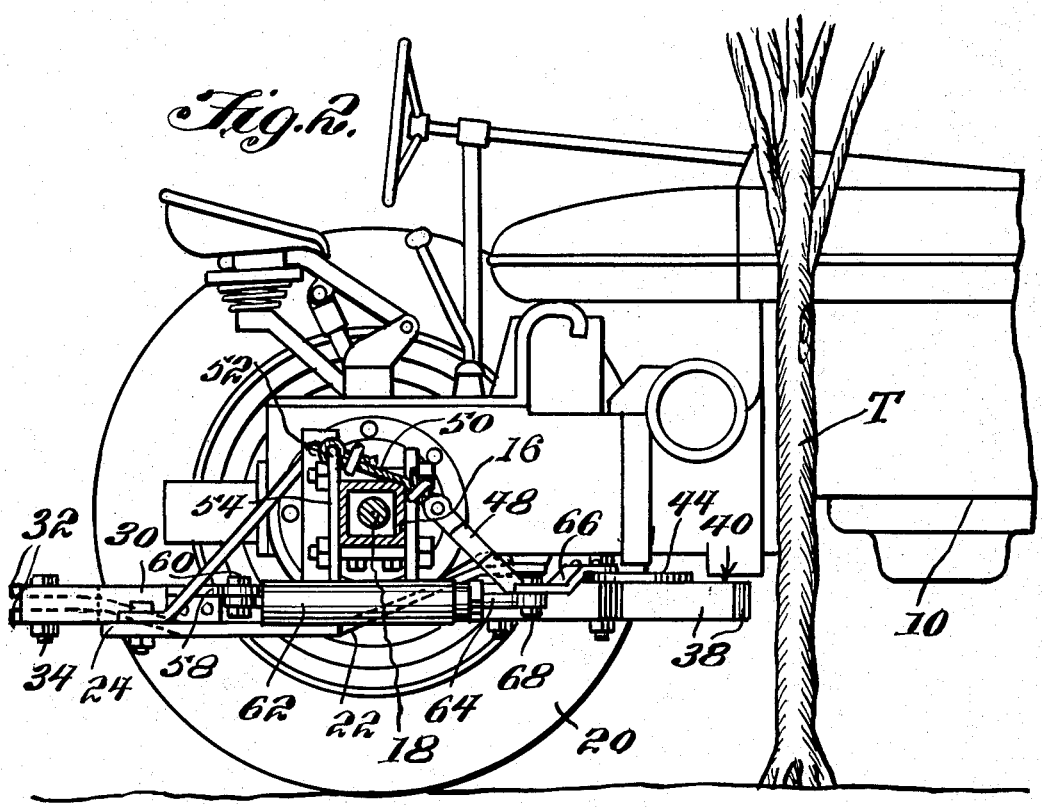
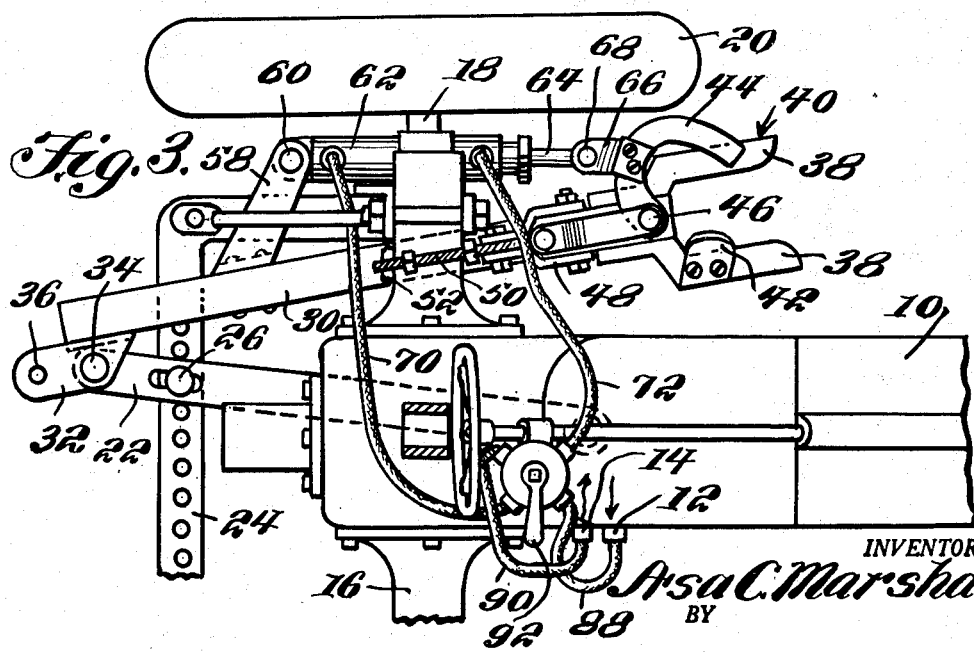
INVENTOR.
Asa C. Marshall,
BY
McMorrow, Berman & Davidson
ATTORNEYS May 29, 1956 — A. C. MARSHALL — 2,747,305
GRUBBING ATTACHMENT FOR A FARM TRACTOR
Filed March 16, 1954 — 3 Sheets-Sheet 3
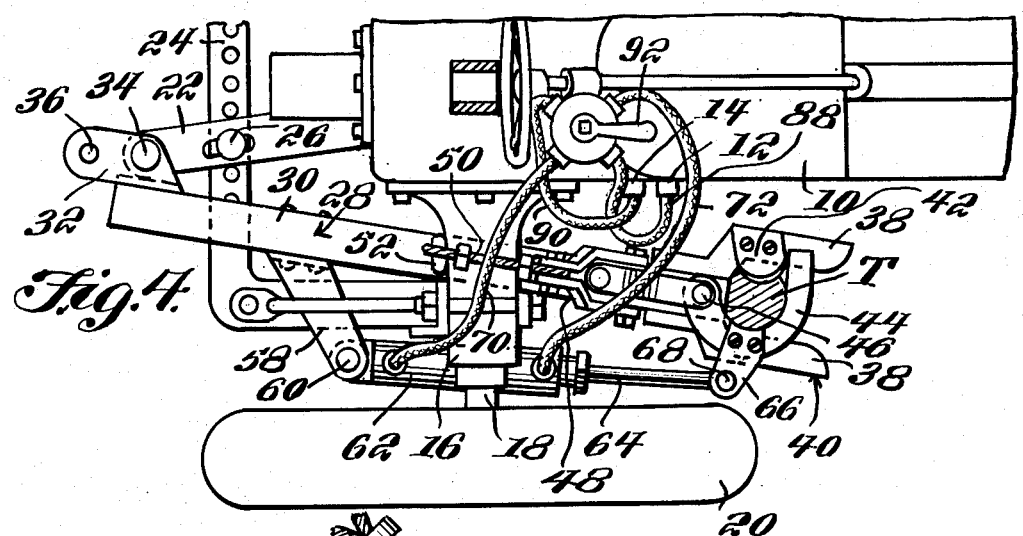
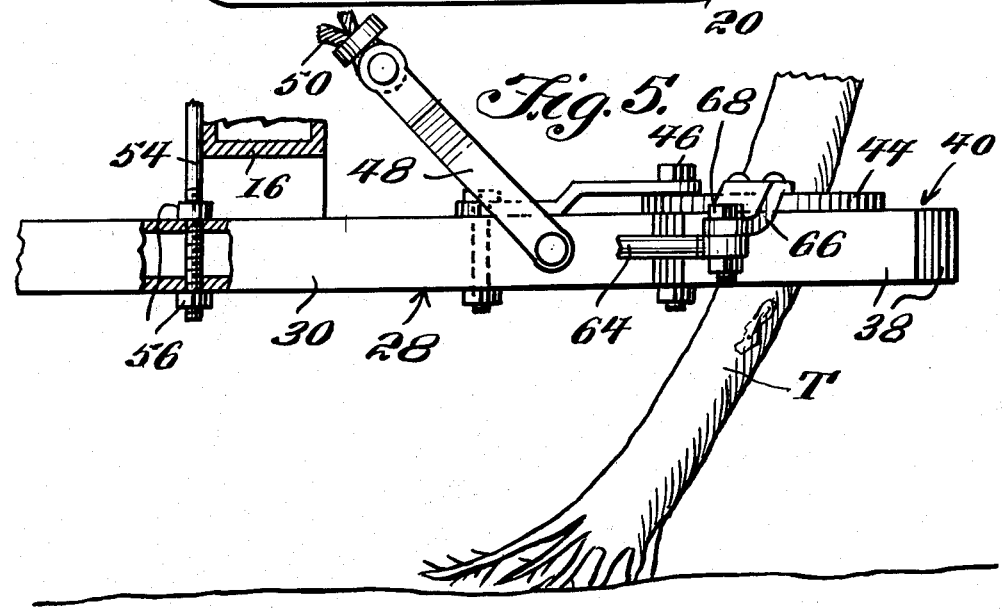
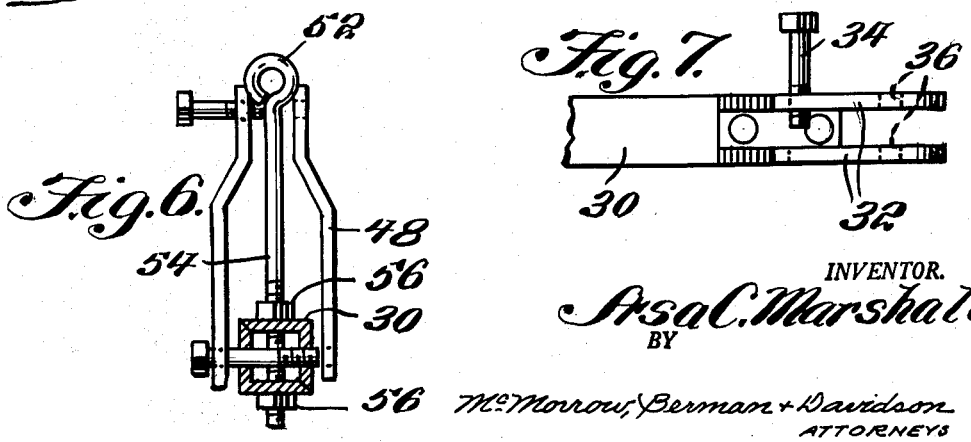
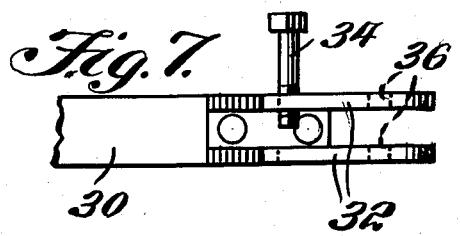
INVENTOR.
Asa C. Marshall,
BY McMorrow, Berman & Davidson
ATTORNEYS

United States Patent Office 2,747,305
Patented May 29, 1956

2,747,305

GRUBBING ATTACHMENT FOR A FARM TRACTOR

Asa C. Marshall, Willis, Va.

Application March 16, 1954, Serial No. 416,628

1 Claim. (Cl. 37—2)

This invention relates to a grubbing attachment for a farm tractor and has for its primary object to extract from the earth shallow rooted growth such as shrubs, saplings and the like.

Another object is to facilitate the rapid coupling of the attachment to a conventional farm tractor so as to render the tractor useful in grubbing operations.

A further object is to enable the attachment to remain on the tractor while the latter is being used in other farming operations.

The above and other objects may be attained by employing this invention which embodies among its features a beam adapted to be attached to the draw bar of a farm tractor and to be connected to the rear axle housing of the tractor between the tractor body and a traction wheel thereof, a grubbing fork carried by the beam in advance of the rear axle housing and having its open end disposed toward the front of the tractor, a hook carried by the fork for movement in an arcuate path across the open end thereof for engaging the trunk of a shrub and retaining it in the fork, and manually controlled power actuated means carried by the beam and operatively connected to the hook for moving it in its arcuate path.

Other features include a jaw carried by the fork and projecting thereinto in the path of movement of the hook for cooperating with the hook in biting into and gripping the work, a bracket carried by the beam and extending outwardly therefrom between the rear end thereof and the axle housing, and manually controlled hydraulically actuated means carried by the bracket and operatively connected to the hook for moving it in its arcuate path.

In the drawings:

Figure 1 is top plan view of a conventional farm tractor showing this improved grubbing attachment in place thereon;

Figure 2 is a sectional view taken substantially on the line 2—2 of Figure 1;

Figure 3 is a view similar to Figure 1, showing the attachment connected to the opposite side of the farm tractor;

Figure 4 is a fragmentary view showing the manner in which the attachment grips the trunk of a shrub or the like;

Figure 5 is a fragmentary side view of Figure 4 on a slightly enlarged scale, showing portions in section more clearly to illustrate certain details of construction;

Figure 6 is a transverse sectional view through the grubbing beam showing the means by which the beam is supported on the rear axle housing of the tractor;

Figure 7 is a fragmentary enlarged detail view of the rear end of the beam showing the coupling by which farm implements may be connected to the tractor with the beam attached thereto;

Figure 8 is a diagrammatic view of the hydraulic system employed in connection with this grubbing attachment; and Figure 9 is a view similar to Figure 8, showing the valve of the hydraulic system in a different position.

Referring to the drawings in detail a farm tractor designated generally 10 is equipped with a conventional hydraulic system (not shown) but carrying couplings 12 and 14 by means of which hydraulic equipment may be operatively connected to the hydraulic system. The tractor 10 is equipped with a conventional rear housing 16 which is rectangular in cross section and houses axle shafts 18 to which are connected traction wheels 20 in a conventional manner. The tractor 10 is equipped with a conventional draw bar 22 which is supported at various angular positions with relation to the rear end of the tractor by a conventional yoke 24 which is provided with the conventional row of openings for the reception of a bolt 26 which holds the draw bar 22 at a selected angle with relation to the tractor 10.

This improved attachment designated generally 28 comprises a beam 30 carrying adjacent one end vertically spaced outwardly extending ears 32 which are provided with aligning openings for the reception of a bolt 34, by means of which the beam 30 is coupled to the draw bar, as will be readily understood upon reference to the drawings. The ears 32 extend rearwardly beyond the draw bar 22 and are provided with aligning openings 36 for the reception of a coupling pin by means of which a farm implement may be connected to the draw bar 22 of the tractor 10. Secured to and extending outwardly and forwardly from the beam 30 remote from the ears 32 are parallel legs 38 defining a fork designated generally 40, one leg of which carries a jaw member 42 which lies in the path of movement of a hook 44 which is pivotally connected as at 46 to the fork 40 for movement in an arcuate path across the open end thereof.

Carried by the beam 30 adjacent the fork 40 and extending upwardly and rearwardly therefrom is a yoke 48 to the upper rear end of which is connected a cable 50, the opposite end of which is connected to an eye 52 carried by a bolt 54 which extends downwardly adjacent the rear side of the axle housing 16 and is connected as at 56 (Fig. 5) to the beam 30. It will thus be seen that the beam 30 of the attachment 28 is suspended on the axle housing 16.

Carried by the beam 30 between its coupling to the axle housing 16 and draw bar 22 is a bracket 58 to which is pivotally connected as at 60 one end of a hydraulic cylinder 62 containing a piston (not shown) to which is connected a piston rod 64 which works through the end of the cylinder remote from the pivotal connection 60 thereof to the bracket 58.

Carried by the hook 44 and extending outwardly therefrom intermediate the ends thereof is an arm 66 to which is pivotally connected as at 68 the piston rod 64 so that as the piston within the cylinder 62 moves longitudinally thereof, the hook 44 will be moved in an arcuate path across the open end of the fork 40.

Coupled to the cylinder 62 adjacent opposite ends thereof are flexible conduits 70 and 72 which are connected respectively to ports 74 and 76 of a conventional four-way valve having a turning plug 78 therein through which extend passages 80 and 82 by means of which communication may be established between the ports 76 and ports 84 and 86 of the valve. The port 86 is connected to a conventional flexible conduit 88 through the coupling 12 which is connected to the discharge side of the hydraulic system while the port 84 is connected through a flexible coupling 90 to the coupling 14 of the return side of the hydraulic system. The turning plug 78 is controlled by a handle 92 disposed adjacent the operator station of the tractor so that manipulation of the hook 44 may be accomplished from the operator station.

In use, it will be evident that with the device coupled to a conventional farm tractor, as illustrated in the drawings, the tractor may be manipulated so as to bring the fork 40 into line with the trunk T of a shrub, sapling or the like that is to be removed. As the fork is advanced to its fullest extent into engagement with the trunk T, the handle 92 of the valve is manipulated to align the passage 80 with the ports 74 and 86, as illustrated in Figure 8, to introduce fluid pressure into the cylinder behind the piston in a direction to drive the piston rod forwardly and move the hook in its arcuate path across the open end of the fork 40 to grip the trunk T, as suggested in Figure 4. Simultaneously, with the registration of the passage 82 with the ports 74 and 86, the passage 80 will register with the ports 76 and 84 to permit such fluid as may have remained in the cylinder between the piston and the forward end of the cylinder to escape through the conduit 72 and return conduit 90. Obviously, when it is desired to move the hook in the opposite direction to release the trunk T, the position of the turning plug 78 is reversed to bring the passage 82 into registration with the ports 74 and 84 and the passage 80 into registration with the ports 76 and 86.

From the foregoing it is obvious that the tractor may be so manipulated that once the trunk T of the growth to be removed has been gripped by the hook 44 and jaw 42, the object to be grubbed may be completely uprooted from the ground without serious disturbance of the top soil.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A grubbing attachment for a farm tractor comprising a beam adapted to be attached adjacent one end to the draw bar of a farm tractor and to extend forwardly therefrom beneath the axle housing of the tractor, a grubbing fork carried by the beam in advance of the axle housing and having its open end disposed toward the front of the tractor, a yoke connected to the beam adjacent the fork and extending upwardly and rearwardly therefrom, a flexible cable connected to the yoke and extending rearwardly therefrom across the rear axle above the top thereof, a bolt connected to the cable and adjustably coupled to the beam adjacent the side of the axle housing remote from the yoke for supporting the beam on the axle housing, a hook carried by the fork for movement in an arcuate path across the open end thereof, a bracket carried by the beam and projecting outwardly therefrom between the draw bar and the axle housing, manually controlled hydraulically actuated means carried by the bracket and operatively connected to the hook for moving the hook in its arcuate path, and a jaw carried by the fork and projecting thereinto for biting into and gripping the work as the hook moves across the open end of the fork.

References Cited in the file of this patent

UNITED STATES PATENTS

| | | |
|---|---|---|
| 1,456,817 | Morton | May 29, 1923 |
| 1,472,262 | Abildgaard | Oct. 30, 1923 |
| 2,440,180 | MacClatchie | Apr. 20, 1948 |
| 2,505,923 | Taylor et al. | May 2, 1950 |
| 2,663,952 | Winget | Dec. 29, 1953 |
| 2,666,541 | Ferrario et al. | Jan. 19, 1954 |